United States Patent
Höfig

(10) Patent No.: US 9,798,605 B2
(45) Date of Patent: Oct. 24, 2017

(54) SUPPORTING GLOBAL EFFECT ANALYSIS

(71) Applicant: Kai Höfig, München (DE)

(72) Inventor: Kai Höfig, München (DE)

(73) Assignee: Siemens Aktiengesellschaft, München (DE)

( * ) Notice: Subject to any disclaimer, the term of this patent is extended or adjusted under 35 U.S.C. 154(b) by 16 days.

(21) Appl. No.: 14/461,936

(22) Filed: Aug. 18, 2014

(65) Prior Publication Data

US 2015/0378802 A1     Dec. 31, 2015

(30) Foreign Application Priority Data

Jun. 27, 2014   (EP) .................................... 14174668

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC ............................ G06F 11/079; G06F 11/0751
See application file for complete search history.

(56) References Cited

U.S. PATENT DOCUMENTS

| | | | | |
|---|---|---|---|---|
| 7,467,073 B2 * | 12/2008 | Nasr | ..................... | G06Q 10/06 703/6 |
| 2005/0149570 A1 * | 7/2005 | Sasaki | .................... | G06Q 10/06 |
| 2010/0262867 A1 * | 10/2010 | Bell | ..................... | G06F 11/008 714/40 |

FOREIGN PATENT DOCUMENTS

| | | |
|---|---|---|
| EP | 2172881 A2 | 4/2010 |
| JP | 2004126816 A | 4/2004 |
| JP | 2005182465 A | 7/2005 |
| JP | 2007323219 A | 12/2007 |
| JP | 2008209988 A | 9/2008 |
| JP | 2011008355 A | 1/2011 |
| JP | 2011507125 A | 3/2011 |
| JP | 2012098820 A | 5/2012 |

OTHER PUBLICATIONS

"A New Component Concept for Fault Trees" to Kaiser et al., 2003, 10 pages.*

(Continued)

*Primary Examiner* — Matt Kim
*Assistant Examiner* — Katherine Lin
(74) *Attorney, Agent, or Firm* — Lempia Summerfield Katz LLC

(57) ABSTRACT

The embodiments relate to methods and systems for supporting a global effect analysis of a technical system. The embodiments include providing a meta-model stored in a computer readable storage medium, where the meta-model comprises at least one assembly of the technical system comprising parts having an associated set of failure mode elements, and where each failure mode element has an associated local effect element. The embodiments also include clustering local effect elements within global effect elements to generate a global effect tree stored within the meta-model.

19 Claims, 5 Drawing Sheets

| Part | Failure Mode | Effect | Global Effect | Measure |
|---|---|---|---|---|
| 1 | 1 | a1 | A | m1 |
| 1 | 2 | a2 | A | m2 |
| 1 | 3 | b1 | B | m1 |
| 2 | 4 | b2 | B | m2 |
| 2 | 5 | a3 | A | m1 |

(56) References Cited

OTHER PUBLICATIONS

Bernhard Kaiser, Peter Liggesmeyer, and Oliver Mäckel "A new component concept for fault trees," in SCS '03: Proceedings of the 8th Australian workshop on safety critical systems and software, pp. 37-46, Darlinghurst, Australia, 2003. Australian Computer Society, Inc., XP055206337, 2003.
Domis Dominik et al: "A Consistency Check Algorithm for Component-Based Refinements of Fault Trees," 2010 IEEE 21st International Symposium on Software reliability Engineering ISSRE, Piscataway NJ (USA), pp. 171-180, XP031801106, ISBN: 978-1-4244-9056-1, 2010.
European Search Report for related European Application No. 15167236.7, dated Oct. 23, 2015.
Mikos W. L. et al.: "A system for distributed sharing and reuse of design and manufacturing knowledge in the PFMEA domain using a description logics-based ontology," Journal of Manufacturing Systems, Society of Manufacturing Engineers, Dearborn, MI, US, vol. 30, No. 3, Jun. 27, 2011, pp. 133-143; XP028286742,ISSN: 0278-6125, DOI 10.1016/J.JMSY.2011.06.001, 2011.
Teoh P.C. et al. "Failure modes and effects analysis through knowledge modeling," Journal of materials processing Technology, Elsevier, NL, vo. 153-154, Nov. 10, 2004, pp. 253-260, XP027526933, ISSN: 0924-0136, 2004.
Chalupa, Rudolf, "Failure Modes, Effects and Diagnostic Analysis," Exida® FMEDA, May 4, 2007.
Hettenbach, Jan, "Failure Modes, Effects and Diagnostic Analysis," Exida® FMEDA, Mar. 2014.
Translation of Japanese office Action for related Japanese Application No. 2015-127605, dated Jun. 13, 2016.
European Search Report for related European Application No. 15 167 236.7 dated Nov. 30, 2016.

\* cited by examiner

FIG 1A          PRIOR ART

| C1 | C2 | C3 | C4 | C5 | C6 | C7 | C8 | C9 |
|----|----|----|----|----|----|----|----|----|
| Nr | Type | Part | Circuit ID | Function | λ | Failure Mode | Effect | % |
| 1 | Capacitor | 10nF/120V | C101 | smooth output | 10.00 | short circuit | amplification factor execeeds limitation | 50% |
|   |   |   |   |   | 10.00 | open circuit | no effect | 50% |
|   |   |   |   |   | 10.00 | Copy this line |   | 0% |
|   |   |   |   |   | 0.00 | Do not copy this line |   | 100% |
| 2 | Resistor | 10kOhm | R305 | regulates amplification factor | 20.00 | short circuit | no effect | 50% |
|   |   |   |   |   | 20.00 | open circuit | amplification factor execeeds limitation | 50% |
|   |   |   |   |   | 20.00 | Copy this line |   | 0% |
|   |   |   |   |   | 0.00 | Do not copy this line |   | 100% |
| 3 | Transistor | NPN SMD Transistor 71 | T004 | amplifies intput | 100.00 | short circuit between pin1 and pin3 | no output | 25% |
|   |   |   |   |   | 100.00 | short circuit between pin1 and GND | amplification factor overexeceeds limitation | 25% |
|   |   |   |   |   | 100.00 | open circuit pin3 | amplification factor overexeceeds limitation | 25% |
|   |   |   |   |   | 100.00 | open circuit pin2 | no output | 25% |
|   |   |   |   |   | 100.00 | Copy this line |   | 0% |
|   |   |   |   |   | 0.00 | Do not copy this line |   | 100% |
| 4 | Transistor | NPN SMD Transistor 71 | T005 | regulates output | 100.00 | short circuit between pin1 and pin3 | output cannot be regulated | 25% |
|   |   |   |   |   | 100.00 | short circuit between pin1 and GND | output cannot be regulated | 25% |
|   |   |   |   |   | 100.00 | open circuit pin3 | no output | 25% |
|   |   |   |   |   | 100.00 | open circuit pin2 | amplification factor overexeceeds limitation | 25% |
|   |   |   |   |   | 100.00 | Copy this line |   | 0% |
|   |   |   |   |   | 0.00 | Do not copy this line |   | 100% |

FIG 1B  PRIOR ART

| C10 gate | C11 dang | C12 * | C13 $\lambda_s$ | C14 $\lambda_d$ | C15 $\lambda_*$ | C16 Diagnosis | C17 DCoomp | C18 $\lambda_{du}$ | C19 $\lambda_{dd}$ |
|---|---|---|---|---|---|---|---|---|---|
| 0 | 1 | 0 | 0.000 | 5.000 | 0.000 | Pulsed test will detect this failure | 90.0 | 0.50 | 4.50 |
| 0 | 0 | 1 | 0.000 | 0.000 | 5.000 | | 0.0 | 0.00 | 0.00 |
| 0 | 1 | 0 | 0.000 | 0.000 | 0.000 | | 0.0 | 0.00 | 0.00 |
| 0 | 0 | 1 | 0.000 | 0.000 | 10.000 | | 0.0 | 0.00 | 0.00 |
| 0 | 1 | 0 | 0.000 | 10.000 | 0.000 | Pulsed test will detect this failure | 90.0 | 1.00 | 9.00 |
| 0 | 1 | 0 | 0.000 | 0.000 | 0.000 | | 0.0 | 0.00 | 0.00 |
| 0 | 1 | 0 | 0.000 | 25.000 | 0.000 | | 0.0 | 25.00 | 0.00 |
| 0 | 1 | 0 | 0.000 | 25.000 | 0.000 | Pulsed test will detect this failure | 90.0 | 2.50 | 22.50 |
| 1 | 0 | 0 | 25.000 | 0.000 | 0.000 | Pulsed test will detect this failure | 90.0 | 0.00 | 0.00 |
| 0 | 1 | 0 | 0.000 | 25.000 | 0.000 | | 0.0 | 25.00 | 0.00 |
| 0 | 1 | 0 | 0.000 | 0.000 | 0.000 | | 0.0 | 0.00 | 0.00 |
| 0 | 1 | 0 | 0.000 | 25.000 | 0.000 | | 0.0 | 25.00 | 0.00 |
| 0 | 1 | 0 | 0.000 | 25.000 | 0.000 | | 0.0 | 25.00 | 0.00 |
| 1 | 0 | 0 | 25.000 | 0.000 | 0.000 | | 0.0 | 0.00 | 0.00 |
| 1 | 0 | 0 | 25.000 | 0.000 | 0.000 | Pulsed test will detect this failure | 90.0 | 0.00 | 0.00 |
| 0 | 1 | 0 | 0.000 | 0.000 | 0.000 | | 0.0 | 0.00 | 0.00 |
| | | | 75.0 | 140.0 | 15.000 | | | 104.0 | 36.00 |

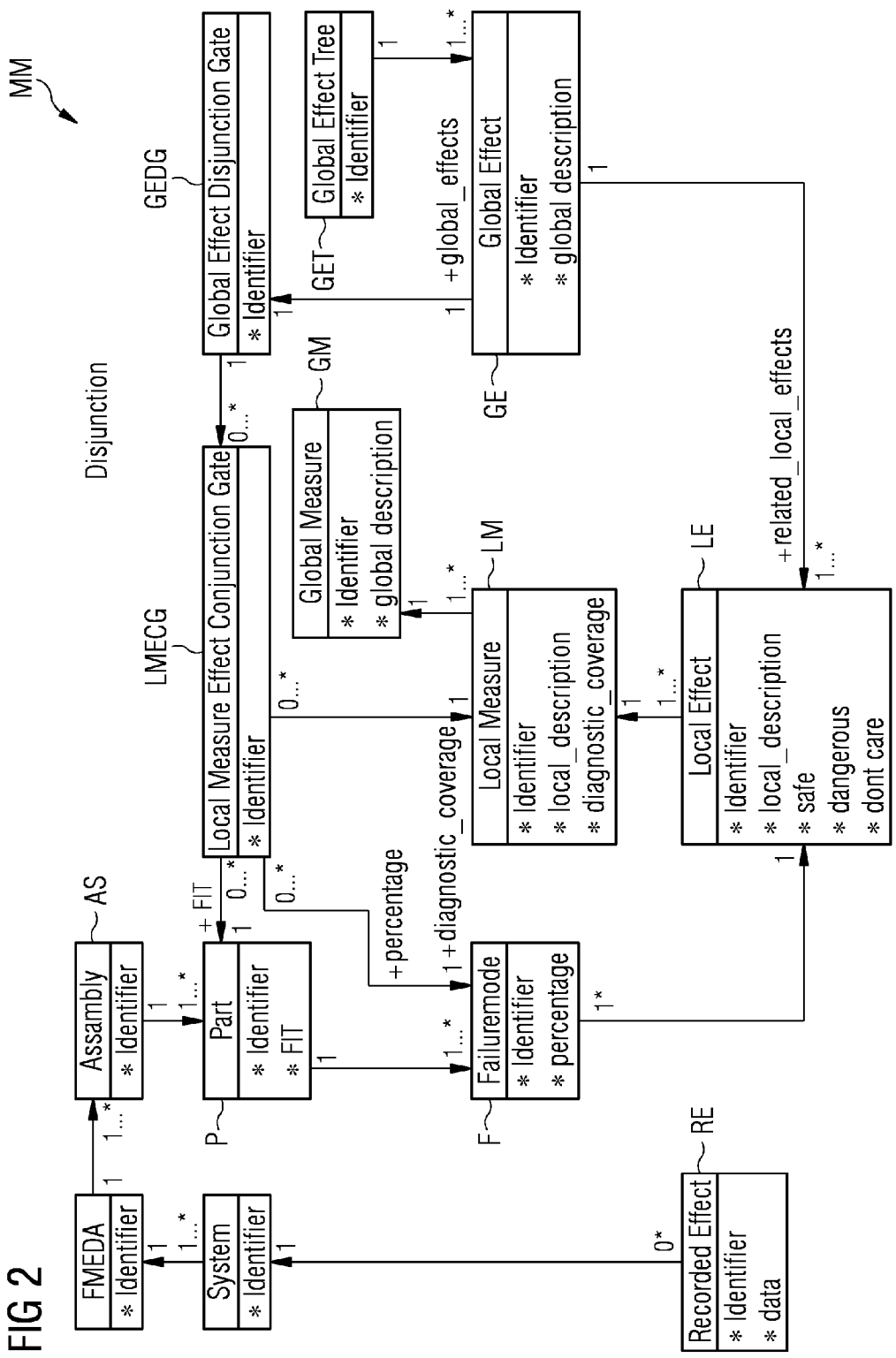

| Part | Failure Mode | Effect | Global Effect | Measure |
|------|--------------|--------|---------------|---------|
| 1 | 1 | a1 | A | m1 |
| 1 | 2 | a2 | A | m2 |
| 1 | 3 | b1 | B | m1 |
| 2 | 4 | b2 | B | m2 |
| 2 | 5 | a3 | A | m1 |

SUPPORTING GLOBAL EFFECT ANALYSIS

CROSS-REFERENCE TO RELATED APPLICATIONS

This application claims the benefit of EP 14174668.5, filed on Jun. 27, 2014, which is hereby incorporated by reference in its entirety.

TECHNICAL FIELD

The embodiments relate to methods and systems for supporting a global effect analysis of a technical system.

BACKGROUND

Failure mode and effect analysis, also named FMEA analysis or just FMEA, examines the consequences of potential failures on the functionality of a technical system. FMEA may be varied for different applications, such as for software or processes and may be either qualitative or quantitative. All variations have in common that they analyze failure modes of elements and their effects on the analyzed technical system.

The FMEA or Failure Mode Effects and Diagnostic Analysis (FMEDA) may be developed using a manually maintained table with the support of a spreadsheet processing computer system. FIGS. 1A and 1B depict an example of a table from such a processing computer system.

In column C1 of the illustrated table, the analyzed parts are numerated. The parts of a technical system S may be for instance formed by components or electronic devices. In column C2, the type of the analyzed part is indicated, (e.g., a capacitor or a resistor). In column C3 of the table as illustrated in FIG. 1A, the electronic type of the part is indicated, (e.g., the capacitor is a 10 nF/120V capacitor). In column C4, the identifier is used to identify the part of the specific technical system as indicated, such as an indication number of the electric circuit plan, (e.g., C101 for the capacitor). In column C5 of the illustrated table, the function of the part is textually described. In column C6 of the table, the failure rate lambda $\lambda$ is indicated, (e.g., 10FIT (failure in time, $1*10^{-9}$ per hour) for the exemplary capacitor). Column C7 of the illustrated table represents the failure modes of the respective part, such as two metal connectors of the capacitor may either short circuit or be damaged and in an open circuit state. Column C8 of the table is used to describe a failure effect that corresponds to the failure mode. For example, if the capacitor is in an open circuit state, the failure has no consequences. Column C9 of the illustrated table is used to allocate, (e.g., split), the failure rate lambda $\lambda$ (as indicated in column C6) to the individual failure modes. For example, the failure rate of 10FIT of the capacitor is equally split for the two failure modes of the capacitor. Columns C10 to C12 of the illustrated table are used to categorize the failure effect into different categories, (e.g., "safe", "dangerous", "disregard," or "don't care"). Columns C13 to C15 of the illustrated table are used to calculate the residual failure rate for the specific failure effect and category (safe $\lambda_s$, dangerous $\lambda_d$ and disregard $\lambda_*$). For example, the failure rate $\lambda_d$ for the failure mode "short circuit" is 5FIT since 10FIT (column C6)*50% (columnC9)*1 (columnC11) =5FIT.

The other columns are calculated accordingly. Column C16 is used to describe a diagnostic measure capable of detecting or mitigating a dangerous failure effect. For example, the failure effect corresponding to the failure mode "short circuit" of the capacitor is detected by a pulsed test signal. Column C17 indicates the effectiveness of this measure. For example, the pulsed signals that detect the dangerous failure effect of the open circuit failure mode of the capacitor may only detect or mitigate a fraction of 90% of the occurrences of that failure effect. Column C18 of the illustrated table is used to calculate the residual failure rate that a dangerous failure effect goes undetected ($\lambda_{du}$). Column C19 is used to calculate the failure rate for the case that the dangerous failure effect is detected by diagnostic measure ($\lambda_{dd}$).

The manually maintained table as illustrated in FIGS. 1A and 1B may contain automation of an instant when implemented in a spreadsheet application. The automation may calculate the values for different failure rates.

Because modern safety critical technical systems tend to include an increased complexity, automations and tool support have a long history in research and industry. Whereas compact embedded systems may be analyzed using FMEA in a manually maintained table such as illustrated in FIGS. 1A and 1B more complex systems may result in unmanageably long tables, in particular when larger or different development teams are involved.

Furthermore, each failure mode in such a conventional table corresponds to a single effect in a technical system and its diagnostic measure. For documentary reasons, this fact may be described textually and has a local character referring to the effect on the analyzed subsystem.

With a conventional FMEA analysis using a textually described local effect the following fundamental problems occur.

The local effects prevent a global effect analysis. Since effects are described in a local manner or with a local reference to the failure mode of a subsystem of the technical system, the manual table may not be analyzed for all impacts of global effects within the table. Especially for larger technical systems, effects are described differently for each column of the FMEA table, but may refer to one global effect. FMEA tables may be long and may contain thousands of lines for a complex technical system. Also, the tables are not filled by a single person but by a team of engineers and designers. It is probable that two different failure effects have different local consequences, however, the effect on a global scale may be the same. For example, the effects "amplification factor exceeds limitations" and "output may not be regulated" might result in the same global effect as illustrated in FIGS. 1A and 1B, (e.g., "system causes environmental damage"). To cluster all local effects with a manual maintained textual global effect would be theoretically possible in a manual table, but utilizing manually maintained clusters is a source for mistakes and inconsistencies. Accordingly, a manual FMEA table may not solve the problems of utilizing local effects for a global analysis.

Further, in a conventional FMEA analysis, local measures may not be utilized for global effects. Measures document preventive functions that may be capable to manage a fraction of a failure mode, and thus may omit or prevent an effect. A manual FMEA only aims at the sum of all effects and measures, however, the quantitative or qualitative analysis for every single effect on a global level needs to utilize all measures. It is likely that two measures are described differently, but prevent the same global effect. As a result, they may not be utilized for a global analysis of the system. For example, the aforementioned effects "amplification factor exceeds limitation" (A) and "output cannot be regulated" (B) describe the same global effect C, (e.g., "system causes environmental damage"). The first effect A is based on the failure modes "short circuit" for part number 1 and "open circuit" for part number 2. Those effects are prevented by the measure "pulsed test will detect this failure". The second effect B "output cannot be regulated" has the same global effect C "system cause environmental damage", but has no measure preventing the (local and global) effect. Information which fraction of failure modes contribute to the global effect may not be analyzed in a conventional FMEA analysis, because it is unclear how local measures may be identified within the locally maintained table, but correspond to the same global effect.

SUMMARY

The scope of the present invention is defined solely by the appended claims and is not affected to any degree by the statements within this summary. The present embodiments may obviate one or more of the drawbacks or limitations in the related art.

According to a first aspect, a method for supporting a global effect analysis of a technical system is provided, the method including: providing a meta-model stored in a computer-readable storage medium, the meta-model including at least one assembly of the technical system including parts having an associated set of failure mode elements, where each failure mode element has an associated local effect element, and clustering local effect elements within global effect elements to generate a global effect tree stored within the meta-model.

In an embodiment of the method according to the first aspect, each local effect element includes safety categorizations and is associated to a local measure element configured to prevent occurrence of the respective local effect during runtime of the technical system.

In a further embodiment of the method according to the first aspect, each generated global effect element stored within the meta-model includes a global description indicating the global effect on the technical system.

In a further embodiment of the method according to the first aspect, the generated global effect tree includes global effect elements via logic gate elements to local effect elements and associated local measure elements.

In a still further embodiment of the method according to the first aspect, the logic gate elements of the generated global effect tree includes local measure effect disjunction gates each representing a pair of a local effect element and an associated local measure, and for each global effect element a global effect conjunction gate representing the conjunction of all possible local effect elements and local measure combinations causing the respective global effect on the technical system.

In a further embodiment of the method according to the first aspect, the local measure elements are clustered in a global measure element of the meta-model.

In a still further embodiment of the method according to the first aspect, each local effect element of the meta-model includes a local description indicating the local effect of a failure mode instance of the failure mode element associated with the respective local effect element on the technical system.

In a still further embodiment of the method according to the first aspect, the meta-model includes generic parts of the technical system, generic failure modes, and associations between the generic parts and the generic failure modes, the associations indicating, for each generic part, one or more generic failure modes associated with the generic part, where each generic failure mode identifies a type of failure for a respective generic part of the technical system.

In a still further embodiment of the method according to the first aspect, the method further includes: instantiating, with a processor, the generic parts and the generic failure modes to generate part instances and failure mode instances, respectively, the part instances and the failure mode instances specifying the technical system, and storing the part instances and the failure mode instances.

In a still further embodiment of the method according to the first aspect, the instantiating of the generic parts and the generic failure modes includes: constructing the part instances and the failure mode instances as objects from classes representing the generic parts and the generic failure modes; or generating the part instances and the failure mode instances as database entries from database content specifying the generic parts and the generic failure modes.

In a still further embodiment of the method according to the first aspect, the method further includes: associating each failure mode instance with a respective one of the part instances based on the associations between the generic failure modes and the generic parts stored in the meta-model, where at least one part instance is associated with more than one failure mode instance; quantifying a failure behavior for each part instance; and storing a percentage in each failure mode instance, the percentage indicating a portion of the quantified failure behavior of the part instance associated with the failure mode instance that corresponds to the failure mode instance.

In a still further embodiment of the method according to the first aspect, the embodiment further includes: generating local effect elements and associating each local effect element with one or more failure mode instances, and storing information about an effect of the associated failure mode instances on the technical system in each local effect element.

In a still further embodiment of the method according to the first aspect, the method further includes: logging events during operation of the technical system, storing recorded effects based on the logged events, associating each recorded effect with a local effect element, and monitoring, based on the frequency of the recorded effects, failure rates of the part instances, the failure mode instances, or both the part instances and the failure mode instances, associated with the local effect element.

In a still further embodiment of the method according to the first aspect, the method further includes: tracing recorded effects of the corresponding local effect elements, the failure mode instances and the part instances, and identifying the part instances that exceed a predetermined failure rate to repair or replace the identified part instances in order for the technical system to comply with failure rate limitations.

The embodiment further provides according to a second aspect a system for supporting a global effect analysis of a technical system, the system including a digital data storage medium configured to store a meta-model, the meta-model including at least one assembly of the technical system including parts having an associated set of failure mode elements, where each failure mode element has an associated local effect element; and a processor configured to: cluster local effect elements within global effect elements to generate a global effect tree, and store the generated global effect tree.

In an embodiment of the system according to the second aspect, the stored meta-model includes generic parts of the technical system, generic failure modes, and associations between the generic parts and the generic failure modes, the associations indicating, for each generic part, one or more generic failure modes associated with the generic part, where each generic failure mode identifies a type of failure for a respective generic part.

In a further embodiment of the system according to the second aspect, the processor is further configured to: instantiate the generic parts and the generic failure modes to generate part instances and failure mode instances specifying the technical system, and store the part instances and the failure mode instances.

In a still further embodiment of the system according to the second aspect, the processor is further configured to instantiate the generic parts and the generic failure modes by: constructing the part instances and the failure mode instances as objects from classes representing the generic parts and the generic failure modes, or generating the part instances and the failure mode instances as database entries from database content specifying the generic parts and the generic failure modes.

In a still further embodiment of the system according to the second aspect, the processor is further configured to: associate each failure mode instance with a respective one of the part instances based on the associations between the generic failure modes and the generic parts stored in the meta-model, where at least one part instance is associated with more than one failure mode instance, quantify a failure behaviour for each part instance, and store a percentage in each failure mode instance, the percentage indicating a portion of the quantified failure behaviour of the part instance associated with the failure mode instance that corresponds to the failure mode instance.

In a still further embodiment of the system according to the second aspect, the processor is further configured to: add to the meta-model a new generic failure mode and an association of the new generic failure mode to a corresponding generic part, and automatically instantiate the new generic failure mode to generate new failure mode instances and associations to all part instances previously instantiated from the corresponding generic part.

In a still further embodiment of the system according to the second aspect, the processor is further configured to: generate local effect elements and associating each local effect element with one or more failure mode instances, and store information about the local effect of the associated failure mode instances on the technical system in each local effect element.

In a still further embodiment of the system according to the second aspect, the processor is further configured to store in each local effect element a safety categorization of the local effect element.

In a still further embodiment of the system according to the second aspect, the processor is further configured to: log events during operation of the technical system, store recorded effects based on the logged events, associate each recorded effect with a local effect element, and monitor, based on the frequency of the recorded effects, failure rates of the part instances, the failure mode instances, or both the part instances and the failure mode instances, that are associated with the local effect element.

In a still further embodiment of the system according to the second aspect, the processor is further configured to: trace recorded effects to the corresponding local effect elements, the failure mode instances and the part instances, and identify the part instances that exceed a predetermined failure rate to repair or replace the identified part instances in order for the technical system to comply with failure rate limitations.

The embodiment further provides according to a third aspect a computer program product including one or more non-transitory computer-readable storage media having stored thereon: a meta-model, the meta-model including at least one assembly of the technical system including parts having an associated set of failure mode elements, where each failure mode element has an associated local effect element, and instructions executable by one or more processors of a computing system, where execution of the instructions causes the computer system to perform operations for supporting a global effect analysis, the instructions including: clustering local effect elements within global effect elements to generate a global effect tree, and storing the generated global effect tree.

BRIEF DESCRIPTION OF THE DRAWINGS

FIGS. 1A and 1B depict an embodiment of a conventional manually maintained FMEA table.

FIG. 2 depicts a meta-model for FMEA in accordance with an exemplary embodiment.

DETAILED DESCRIPTION

FIG. 2 illustrates a schematic diagram of an exemplary meta-model MM that may be used by the method and system according to different aspects. The meta-model MM illustrated in FIG. 2 is stored in a computer-readable storage medium. The meta-model MM illustrated in FIG. 2 may be used for global effect analysis of a technical system S, in particular a complex technical system S including a plurality of subsystems, parts such as an industrial plant or a vehicle. The technical system S may include multiple assemblies AS. Each assembly AS is a set of analyzable elements of the technical system S that builds a logic unit. Each element of an assembly AS includes a various number of parts (1 . . . 1) that forms a part P, such as an electronic device. Each part P has an associated set of failure modes F. The failure mode F describes a specific kind of failure that a part P may have. Since a part P has a quantified behavior to fail, referred to as FIT, a failure mode F has a percentage to assign a percentage part of the quantified failure behavior of the part P to the specific failure mode F. Each failure mode F has an associated local effect element LE that holds in an embodiment the information "local description" about the local effect of the failure mode instance on the technical system S. The local effect LE is classified and quantified in a category, (e.g., in a safety category). In an exemplary embodiment, the local effect is categorized to different safety categories including the categories "safe," "dangerous," and "do not care" to mark an effect as not harmful (e.g., safe) with no effects on the outcome of the analysis (e.g., do not care), or as harmful (e.g., dangerous). Furthermore, a local effect LE includes an associated so-called local measure LM. The local measure element LM prevents the local effect to occur, for example, if a local effect LE is detected during the runtime of the analyzed technical system S, the technical system S is set into a shutdown state (e.g., safe state) to prevent the local effect LE. Since mechanisms detecting failure mode instances during the runtime of the technical system are not 100% effective, the local effect LE may have an associated effectiveness, such as a quantified percentage value (e.g., diagnostic coverage).

To allow the clustering of local effects LE programmatically, (e.g., within a database such as MySQl or ACCESS), all elements of the meta-model MM as illustrated in FIG. 2 have in an embodiment identifiers that allow to explicitly identify them. As illustrated in FIG. 2, a global effect GE has related local effects LE. The global effect element GE clusters specific local effects within one global effect to allow an automated analysis for global effects on the system S. The global effect element GE also holds in an embodiment a global description of the global effect GE that may be used by an analyst.

Figures 3, 4:
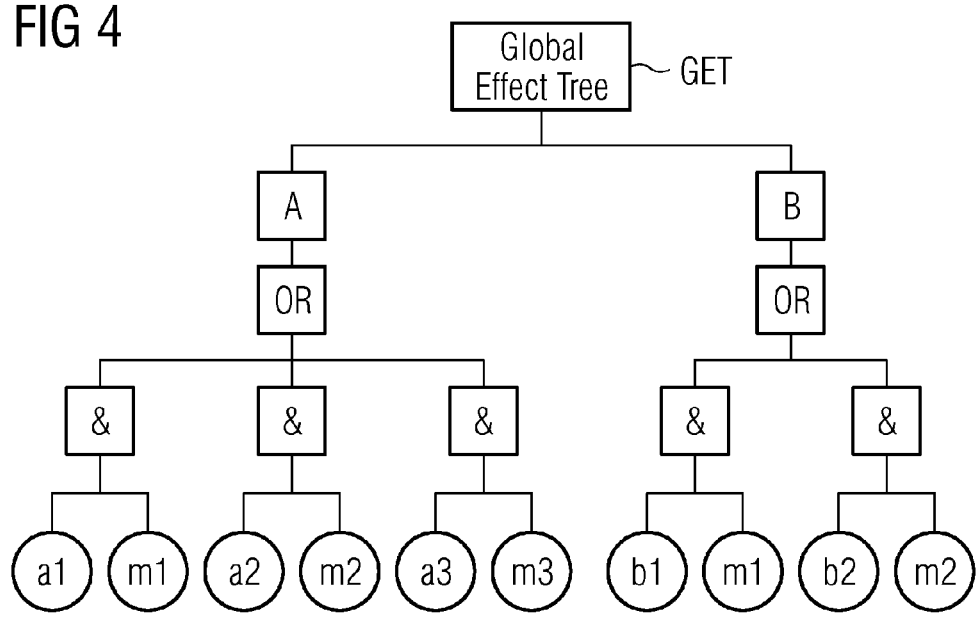
FIG. 3 depicts an exemplary embodiment of a FMEA table of an investigated technical system that may be analyzed by a system.
FIG. 4 depicts an exemplary embodiment of a global effect tree generated by the method and system for the FMEA table illustrated in FIG. 3.

To perform a global analysis, all global effects GE are contained within a global effect tree GET. The local effect element LE are clustered within the global effect elements GE to generate the global effect tree GET stored within the meta-model MM as illustrated in FIG. 2. Each generated global effect tree GET includes the global effect elements GE that are connected via logic gate elements to local effect LE elements and associated local measure elements LM. An example of a global effect tree GET is illustrated in FIG. 4.

The logic gate elements of the generated global effect tree GET may include in an embodiment local measure effect conjunction gates LMECG each representing a pair of a local effect element LE and an associated local measure element LM and global effect disjunction gates GEDG representing the conjunction of all possible local effect and local measure combinations causing the respective global effect on the technical systems. The global effect element GE of the meta-model MM clusters specific local effects LE within one global effect GE to allow an automated analysis of the technical system S for global effects. The global effect element GE may also hold a global description of the respective global effect used by the analysis.

To allow a global analysis, all global effects GE are contained within the global effect tree GET. With the elements GET "global effect tree," global effect disjunction gate GEDG and local measure effect conjunction gate LMECG, a data structure is constructed that may be used for quantitative or qualitative analysis of the technical system. In one act, the FMEA is performed using the required aforementioned elements of the meta-model MM, (e.g., FMEDA, assembly AS, part P, failure mode F, local measure LM and local effect LE), in a data structure that allows relations like MySQL or ACCESS. In a further act during the FMEA development process, local effects may be related to global effects. With this information, the global effect tree GET may be generated automatically. The generated data structure may be analyzed for all global effects. These global effects are related to the global effect tree elements.

In an embodiment, for each global effect element GE, a new logic gate element may be created, (e.g., the "global effect disjunction gate" GEDG as illustrated in FIG. 2). This logic gate element GEDG represents the disjunction of all possible local effects and local measure combinations for performing the global effect analysis. For example, if a Boolean tree is selected as the desired structure for analysis, this logic gate element is represented as an OR gate in the respective tree. Each global effect disjunction gate element GEDG gets related multiple local measure effect conjunction gate elements LMECG.

Each local measure effect conjunction gate element LMECG represents one pair of a local effect LE and a local measure LM one for each local effect that is related to the global effect element that belongs to the global effect disjunction gate element GEDG. For example, if a Boolean tree is selected as the desired structure for analysis, this conjunction gate element is represented as an AND gate in the tree and is related as an input to the OR gate represented by the global effect disjunction gate element GEDG in a Boolean tree. The local measure effect conjunction gate element LMECG represents the residual effect after a measure has been applied. To represent this, the data structure is utilized to identify and relate the corresponding failure mode element FM, part element P and local measure element LM to the local measure effect conjunction gate element LMECG. This may be done, since the local measure effect conjunction gate LMECG is related to the global effect disjunction gate element GEDG that is related to a global effect element GE, which is related to a local effect element LE that is related to the required failure mode F, local measure element LM and part elements P. The element global measure GM in FIG. 2 may be used to cluster also measures in a global manner with a global textual description of the respective measure. This may support the user to better understand a specific measure within the global analysis, since local measures would describe a measure specific to a local effect that might be hard to understand within a global analysis.

One FMEA of the meta-model MM covers analytically all system instances or products in the real world. To allow diagnosis, effects of failure modes of real world technical systems may be recorded. Each technical system may have various failure modes F and therefore different effects are recordable during runtime of the technical system. These recorded effects RE are associated to the effects documented in the FMEA to monitor the actual or current failure rates during runtime of the technical system.

The direction of the associations of the meta-model MM illustrated in FIG. 2 documents a correlation. The direction of the arrow illustrated in FIG. 2 is only conceptual, the implementation of the meta-model MM, (e.g., in a database structure), works bidirectional. The quantifications connected to the associations are only exemplary and may change for different domains or different types of FMEA. For example, the association between the elements recorded event RE and system S documents that a recorded event RE belongs to a system S and that every recorded effect RE belongs to exactly one system but that every system may have zero or any arbitrary number of recorded events RE.

To illustrate the use of the meta-model MM as illustrated in FIG. 2 and the generation of a global effect tree GET, an abstract simple example for a FMEA and a resulting global effect tree GET is described with reference to FIGS. 3 and 4. FIG. 3 depicts a FMEA table of a simple technical system. Each row documents a failure mode F of a specific part P, its effect and a corresponding measure. Additionally, global effects have been inserted as illustrated in FIG. 3.

FIG. 4 depicts the corresponding global effect tree GET using a Boolean notation. The global effect tree GET illustrated in FIG. 4 has two associated global effect elements A and B from the FMEA data structure illustrated in FIG. 3. For each global effect A, B, one global effect disjunction gate GEDG, represented by an element labeled with OR, is associated to the global effect. This element has associated local measure effect conjunction gate elements LMECG labeled with an "&" symbol, one for each local effect and its corresponding measure. The meta-model MM and the data structure allow a global analysis for the effects a1, a2, a3 or b1 and b2 including the impact of the measures m1 and m2. For a quantitative analysis, the failure rates FIT from the parts P, the fraction of the failure rate that is related to the failure mode (percentage) and the effectiveness of the measure (diagnostic coverage) may be used to quantify each local effect measure conjunction gate LMECG, for example, with: FIT(&)=FIT(failuremode)*Percentage(local effect) *Percentage(measure).

Accordingly, the quantification for the global effect disjunction gate GEDG is then:

$$FIT(OR)=FIT(\&1)+\ldots+FIT(\&n).$$

Figure 5:
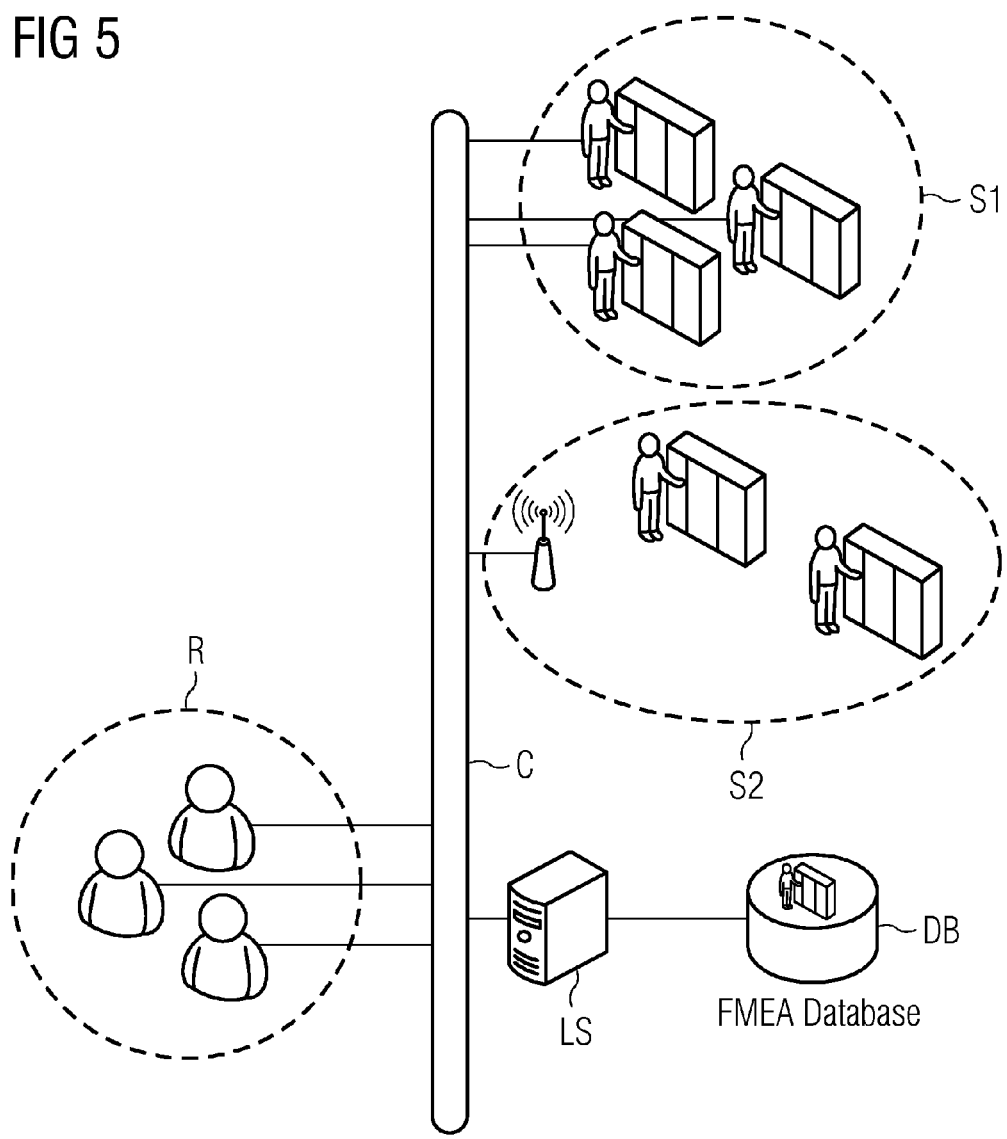
FIG. 5 depicts an exemplary implementation of a method and system for supporting a global effect analysis of a technical system.

FIG. 5 depicts a diagram for illustrating an exemplary implementation of a system for supporting a global effect analysis of a technical system according to the aspect. FIG. 5 depicts a FMEA database DB of at least one technical system S. The computer system LS may be used having access to the FMEA database as illustrated in FIG. 5. The computer system LS is connected via a wired or wireless connection C to one or several system implementations. In the exemplary embodiment of FIG. 5, the computer system LS is connected via the wired or wireless connection C to two different system implementations or technical systems S1, S2, (e.g., using event logging mechanisms). In an embodiment, generic failure modes and generic parts that may be used to build systems such as systems S1, S2 may be connected in a component database. The roles R, (e.g., analysts, designers and/or engineers), may use the component database to generate and/or perform a FMEA analysis of a specific technical system stored in the FMEA database DB. Field data may be associated with certain technical effects using the wired or wireless connection C to the system implementations S1, S2. Because all elements of the meta-model MM described in the context of FIG. 2 use a unique identifier, the relations and associations of elements may be used in a database system to avoid inconsistencies. If the number of failure modes of a part is to be increased, a new failure mode may be incorporated, (e.g., inserted as a generic failure mode with an association to the corresponding generic part into the component database). Because all part instances refer to the unique identification number ID of a generic part missing failure mode instances may be automatically inserted for every part instance in a specific FMEA analysis. Roles R of the analysis, design and/or engineering team may then be assured that all failure modes are listed for each part instance and that the model is consistent. Based on these consistent failure modes, effect elements may be selected from the FMEA database for a specific system. In this way, an effect element, in particular a local effect element LE and/or a global effect element GE, may be used many times. On the other hand, an effect element may be used by associating the effect element with many failure mode instances. On the other hand, an effect element may be used for the analysis of several specific systems. The computer system LS may analyze automatically where the effect element is used in the analysis. This analysis also becomes more detailed, because a failure rate may be calculated separately for every effect element. Using the consistent FMEA database with reused effect elements and consistent failure modes, failure effects measure for each implementation of the technical system may be traced for the corresponding failure modes of involved parts. The tracing helps to identify components and electronic devices that exceed the assumed failure rates and that may be repaired or replaced to maintain the implementations of the technical system in the desired failure rate limitations of the analysis.

In an embodiment, the method includes instantiating with a processor of the computer system LS, the generic parts and the generic failure modes to generate part instances and failure mode instances, respectively, where the part instances and the failure mode instances specify the technical system. The generated part instances and failure mode instances may be stored in the database.

In an embodiment, instantiating the generic part and the generic failure modes include constructing the part instances and the failure mode instances as objects from classes representing the generic parts and the generic failure modes. Alternatively, the part instances and the failure mode instances are generated as database entries from database content specifying the generic parts and generic failure modes.

In an embodiment, each failure mode instance is associated with a respective one of the part instances based on the associations between the generic failure modes and the generic parts stored in the meta-model MM, where at least one part instance is associated with more than one failure mode instance. In a further act, a failure behavior for each part instance is quantified. In an embodiment, a percentage in each failure mode instance is stored, where the percentage indicates a portion of the quantified failure behavior of the part instance associated with the failure mode instance.

In an embodiment, the method further includes generating local effect elements LE and associating each local effect element with one or more failure mode instances and storing information about an effect of the associated failure mode instances on the technical system S in each local effect element LE. In an embodiment, events during operation of the technical system are logged. Further, recorded effects based on the logged events are stored. Each recorded effect is then associated with a local effect element LE. Finally, based on the frequency of the recorded effects, the failure rates of the part instances, failure mode instances or both the part instances and the failure mode instances associated with the local effect element are monitored.

In an embodiment, the recorded effects are traced to corresponding local effect elements LE, the failure mode instances and the part instances. Finally, the part instances that exceed a predetermined failure rate are identified to repair or replace the identified part instances in order for the technical system to comply with predetermined failure rate limitations.

The above-described method may be implemented via a computer program product including one or more readable storage media having stored thereon instructions executable by one or more processors of the computing system LS. Execution of the instructions causes the computing system LS to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and nonvolatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

The present invention has been described in detail with reference to embodiments thereof and examples. Variations and modifications may, however, be effected within the spirit and scope of the invention covered by the claims.

It is to be understood that the elements and features recited in the appended claims may be combined in different ways to produce new claims that likewise fall within the scope of the present invention. Thus, whereas the dependent claims appended below depend from only one single independent or dependent claim, it is to be understood that these dependent claims may, alternatively, be made to depend in the alternative form and preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it is to be understood that all equivalents and/or combinations of embodiments are intended to be included in this description.

The method and system for supporting a global effect analysis of a technical system may be used for any complex technical system, such as an industrial plant or industrial complex product such as a vehicle.

The invention claimed is:

1. A method for supporting a global effect analysis of a technical system, the method comprising:
   providing a meta-model stored in a computer readable storage medium, the meta-model comprising at least one assembly of the technical system comprising parts having an associated set of failure mode elements, wherein each failure mode element has an associated local effect element, each local effect element being associated to a local measure element configured to prevent occurrence of the respective local effect during runtime of the technical system;
   clustering local effect elements within global effect elements of the meta-model;
   clustering local measure elements within global measure elements of the meta-model;
   generating a global effect tree with the global effect elements;
   storing the generated global effect tree within the meta-model;
   automatically analyzing, using a processor, global effects on the technical system using the generated global effect tree;
   identifying one or more parts of the technical system that exceed a predetermined failure rate; and
   repairing or replacing the identified one or more parts in order for the technical system to comply with failure rate limitations.

2. The method according to claim 1, wherein each local effect element comprises safety categorizations.

3. The method according to claim 1, wherein each global effect element stored within the meta-model comprises a global description indicating the global effect on the technical system.

4. The method according to claim 1, wherein the global effect elements are connected, via logic gate elements, to the local effect elements and associated local measure elements within the global effect tree.

5. The method according to claim 4, wherein the logic gate elements of the generated global effect tree comprise:
   local measure effect conjunction gates, with each local measure effect conjunction gate representing a pair of a local effect element and an associated local measure element; and
   a global effect disjunction gate for each global effect element, with each global effect disjunction gate representing the disjunction of all possible local effect elements and local measure elements combinations causing the respective global effect on the technical system.

6. The method according to claim 1, wherein each local effect element of the meta-model comprises a local description indicating the local effect of a failure mode instance of the failure mode element associated with the respective local effect element on the technical system.

7. The method according to claim 1, wherein the meta-model comprises:
   generic parts of the technical system, generic failure modes, and associations between the generic parts and the generic failure modes, the associations indicating, for each generic part, one or more generic failure modes associated with the generic parts, wherein each generic failure mode identifies a type of failure for a respective generic part of the technical system.

8. The method according to claim 7, the method further comprising:
   instantiating, with the processor, the generic parts and the generic failure modes to generate part instances and failure mode instances, respectively, the part instances and the failure mode instances specifying the technical system; and
   storing the part instances and the failure mode instances.

9. The method according to claim 8, wherein instantiating the generic parts and the generic failure modes comprises:
   constructing the part instances and the failure mode instances as objects from classes representing the generic parts and the generic failure modes; or
   generating the part instances and the failure mode instances as database entries from database content specifying the generic parts and the generic failure modes.

10. The method according to claim 8, further comprising:
    associating each failure mode instance with a respective one of the part instances based on the associations between the generic failure modes and the generic parts stored in the meta-model, wherein at least one part instance is associated with more than one failure mode instance;
    quantifying a failure behavior for each part instance; and
    storing a percentage in each failure mode instance, the percentage indicating a portion of the quantified failure behavior of the part instance associated with the failure mode instance that corresponds to the failure mode instance.

11. The method according to claim 8, further comprising:
    generating the local effect elements and associating each local effect element with one or more failure mode instances; and
    storing information about an effect of the associated failure mode instances on the technical system in each local effect element.

12. The method according to claim 11, further comprising:
logging events during operation of the technical system;
storing recorded effects based on the logged events;
associating each recorded effect with a local effect element; and
monitoring, based on the frequency of the recorded effects, failure rates of the part instances, the failure mode instances, or both the part instances and the failure mode instances, associated with the local effect element.

13. The method according to claim 12, further comprising:
tracing recorded effects to the corresponding local effect elements, the corresponding failure mode instances, and the corresponding part instances; and
identifying the part instances that exceed a predetermined failure rate to repair or replace the identified part instances in order for the technical system to comply with failure rate limitations.

14. The method according to claim 2, wherein each global effect element stored within the meta-model comprises a global description indicating the global effect on the technical system.

15. The method according to claim 14, wherein the global effect elements are connected, via logic gate elements, to the local effect elements and associated local measure elements within the global effect tree.

16. The method according to claim 15, wherein the logic gate elements of the generated global effect tree comprise:
local measure effect conjunction gates, with each local measure effect conjunction gate representing a pair of a local effect element and an associated local measure element; and
a global effect disjunction gate for each global effect element, with each global effect disjunction gate representing the disjunction of all possible local effect elements and local measure elements combinations causing the respective global effect on the technical system.

17. The method according to claim 3, wherein the global effect elements are connected, via logic gate elements, to the local effect elements and associated local measure elements within the global effect tree.

18. The method according to claim 17, wherein the logic gate elements of the generated global effect tree comprise:
local measure effect conjunction gates, with each local measure effect conjunction gate representing a pair of a local effect element and an associated local measure element; and
a global effect disjunction gate for each global effect element, with each global effect disjunction gate representing the disjunction of all possible local effect elements and local measure elements combinations causing the respective global effect on the technical system.

19. The method according to claim 2, wherein each local effect element of the meta-model comprises a local description indicating the local effect of a failure mode instance of the failure mode element associated with the respective local effect element on the technical system.

* * * * *